United States Patent
Takeuchi et al.

(10) Patent No.: US 9,081,433 B2
(45) Date of Patent: Jul. 14, 2015

(54) METHOD OF PROCESSING TOUCH-SENSOR DATA AND APPARATUS FOR PERFORMING THE SAME

(71) Applicant: SAMSUNG DISPLAY CO., LTD., Yongin, Gyeonggi-Do (KR)

(72) Inventors: Noboru Takeuchi, Cheonan-si (KR); Tadashi Amino, Cheonan-si (KR); Dae-Cheol Kim, Hwaseong-si (KR); Woong-Kwon Kim, Cheonan-si (KR); Byeong-Hoon Cho, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 29 days.

(21) Appl. No.: 14/107,539

(22) Filed: Dec. 16, 2013

(65) Prior Publication Data

US 2014/0306901 A1    Oct. 16, 2014

(30) Foreign Application Priority Data

Apr. 15, 2013   (KR) .................. 10-2013-0040745

(51) Int. Cl.
*G06F 3/041* (2006.01)
*G09G 5/14* (2006.01)
*G06F 3/0488* (2013.01)

(52) U.S. Cl.
CPC .............. *G06F 3/041* (2013.01); *G06F 3/0418* (2013.01); *G06F 3/0488* (2013.01); *G09G 5/14* (2013.01)

(58) Field of Classification Search
None
See application file for complete search history.

(56) References Cited

U.S. PATENT DOCUMENTS

| 7,846,021 B2* | 12/2010 | Kamiyama et al. ............ 463/31 |
| 7,920,128 B2 | 4/2011 | Park et al. |
| 8,330,777 B2 | 12/2012 | Kim |
| 2006/0119590 A1 | 6/2006 | Park et al. |
| 2010/0007613 A1* | 1/2010 | Costa .......................... 345/173 |
| 2010/0212974 A1 | 8/2010 | Kim |
| 2010/0225615 A1 | 9/2010 | Kurokawa |
| 2013/0002593 A1* | 1/2013 | Miller et al. ................. 345/173 |

FOREIGN PATENT DOCUMENTS

| KR | 1020080096975 | 11/2008 |
| KR | 1020090037535 | 4/2009 |
| KR | 2011-086984 | 4/2011 |
| KR | 1120164 | 9/2011 |

* cited by examiner

*Primary Examiner* — Muhammad N Edun
(74) *Attorney, Agent, or Firm* — F. Chau & Associates, LLC

(57) ABSTRACT

A method of processing touch-image data includes calculating a plurality of motion vectors using a plurality of low-resolution touch-image data frames, aligning sensing data corresponding to an object detected in the low-resolution touch-image data frames using the motion vectors to generate an overlapped touch-image data frame, generating high-resolution data corresponding to the detected object using the overlapped touch-image data frame and detecting the touch position and generating touch position data of the detected object using the high-resolution touch position data corresponding to the detected object.

20 Claims, 6 Drawing Sheets

METHOD OF PROCESSING TOUCH-SENSOR DATA AND APPARATUS FOR PERFORMING THE SAME

CROSS-REFERENCE TO RELATED APPLICATIONS

This non-provisional patent application claims priority under 35 U.S.C. §119 to Korean Patent Application No. 10-2013-0040745, filed on Apr. 15, 2013, which is hereby incorporated by reference as if fully set forth herein.

TECHNICAL FIELD

Exemplary embodiments of the inventive concept relate to a method of driving a display panel and a display apparatus performing the method of driving the display panel. More particularly, exemplary embodiments of the inventive concept relate to a method of driving a display panel capable of improving a driving reliability and a display apparatus performing the above-mentioned method.

DISCUSSION OF THE RELATED ART

Generally, a liquid crystal display ("LCD") apparatus has relatively thin thickness, light weight and low power consumption, and thus they are used in monitors, laptop computers and cellular phones and wall-mounted televisions. The LCD apparatus includes an LCD panel configured displaying images using the variable light transmittance of a liquid crystal, a backlight assembly disposed under the LCD panel and providing backlighting to the LCD panel and a driving circuit driving the LCD panel.

Recently, an array of touch sensors on the front of a display apparatus, providing a touch panel has been widely adopted in mobile phones and other devices. In the touch panel, a touch signal is inputted by a touch providing object such as a stylus pen, a human finger and so on which can obviate the need an additional separate user input device such as a wired keyboard or computer mouse. The touch sensing display apparatus includes a touch panel which generates sensing data sensing each touch by the touch providing object and a liquid crystal panel which displays an image. Touch panels may be classified into a capacitive type touch panel, a resistive type touch panel and an optical type touch panel according to the touch detecting method employed. In some implementations of touch panels, actual physical contact between a touch providing object and a touch sensor in a panel is not required to generate touch-sensing data.

When the number of touch sensors in the touch panel are increased, the resolution of the sensing data sensed from the touch panel may be increased. However, if the number of the touch sensors in the touch panel is increased, an aperture ratio may be decreased. In addition, if a size of each touch sensor is decreased, the sensitivity of each touch sensor may be decreased.

SUMMARY OF THE INVENTIVE CONCEPT

Exemplary embodiments of the inventive concept provide a method of processing sensing data for obtaining high-resolution sensing data.

Exemplary embodiments of the inventive concept also provide a display apparatus for performing the method of processing sensing data.

According to an aspect of the inventive concept, there is provided a method of processing sensing data includes calculating a plurality of motion vectors using a plurality of low-resolution data frames, aligning sensing data corresponding to an object in the low-resolution data frames using the motion vectors to generate an overlapped data frame, generating high-resolution data corresponding to the object using the overlapped data frame and detecting a touch position data of the object using the high-resolution data of the object.

In an exemplary embodiment, the method may further include correcting the high-resolution data of the object using example based data stored in a storage part.

In an exemplary embodiment, the sensing data may have variable grayscales.

In an exemplary embodiment, a spacing distance between the high-resolution data may be decreased as ½ of a spacing distance between the low-resolution data.

In an exemplary embodiment, the generating the high-resolution data may include mapping entire sensing data of the overlapped data frame to high-resolution data In an exemplary embodiment, the generating the high-resolution data may include mapping sensing data of a first area in the overlapped data frame to high-resolution data, the first area including the sensing data of the object.

In an exemplary embodiment, the generating the high-resolution data may further include applying sensing data in one of the low-resolution data frames as sensing data of a second area of the overlapped data frame, the second area being except for the first area in the overlapped data frame.

In an exemplary embodiment, the generating the high-resolution data may further include omitting sensing data of a second area except for the first area in the overlapped data frame.

According to an aspect of the inventive concept, there is provided a display apparatus includes a display/sensor panel part comprising a pixel part displaying an image and a sensing part sensing a touch of an object, a display driving part driving the pixel part, a sensing driving part driving the sensing part, and a sensing control part calculating a plurality of motion vectors using a plurality of low-resolution data frames, aligning sensing data corresponding to an object in the low-resolution data frames using the motion vectors to generate an overlapped data frame and generating high-resolution data corresponding to the object using the overlapped data frame.

In an exemplary embodiment, the sensing control part may include a motion vector calculating part calculating a plurality of motion vectors using a plurality of low-resolution data frames, a position alignment part aligning sensing data corresponding to an object in the low-resolution data frames using the motion vectors to generate an overlapped data frame, a high-resolution generating part generating high-resolution data corresponding to the object using the overlapped data frame and a position detecting part detecting a touch position data of the object using the high-resolution data of the object.

In an exemplary embodiment, the high-resolution generating part may correct the high-resolution data of the object using example based data stored in a storage part.

In an exemplary embodiment, the sensing data may have variable grayscales.

In an exemplary embodiment, a spacing distance between the high-resolution data may be decreased as ½ of a spacing distance between the low-resolution data.

In an exemplary embodiment, the high-resolution generating part may map entire sensing data of the overlapped data frame to high-resolution data.

In an exemplary embodiment, the high-resolution generating part may map sensing data of a first area in the overlapped data frame to high-resolution data, the first area including the sensing data of the object.

In an exemplary embodiment, the high-resolution generating part may apply sensing data in one of the low-resolution data frames as sensing data of a second area of the overlapped data frame, the second area being except for the first area in the overlapped data frame.

In an exemplary embodiment, the high-resolution generating part may omit sensing data of a second area except for the first area in the overlapped data frame.

According to an aspect of the inventive concept, there is provided a display apparatus including a touch-sensor array (panel) part comprising: a plurality of touch-sensing parts for sensing the touch-image of an object; a sensing driving part driving the touch-sensing parts; and a sensing control part calculating a plurality of motion vectors using a plurality of low-resolution touch-image data frames, aligning sensing data corresponding to an object in the low-resolution touch-image data frames using the motion vectors to generate an overlapped touch-image data frame and generating high-resolution touch-image data corresponding to the object using the overlapped touch-image data frame.

According to an aspect of the inventive concept, the high-resolution data frame is generated using sequential low-resolution data frames so that accurate sensing data of the object may be obtained. Therefore, the touch position of the object may be accurately detected.

Hereinafter, exemplary embodiments of the inventive concept will be explained in detail with reference to the accompanying drawings.

BRIEF DESCRIPTION OF THE DRAWINGS

The above and other features of the inventive concept will become more apparent by describing in detailed exemplary embodiments thereof with reference to the accompanying drawings, in which.

DETAILED DESCRIPTION OF EXEMPLARY EMBODIMENTS

Figure 1:
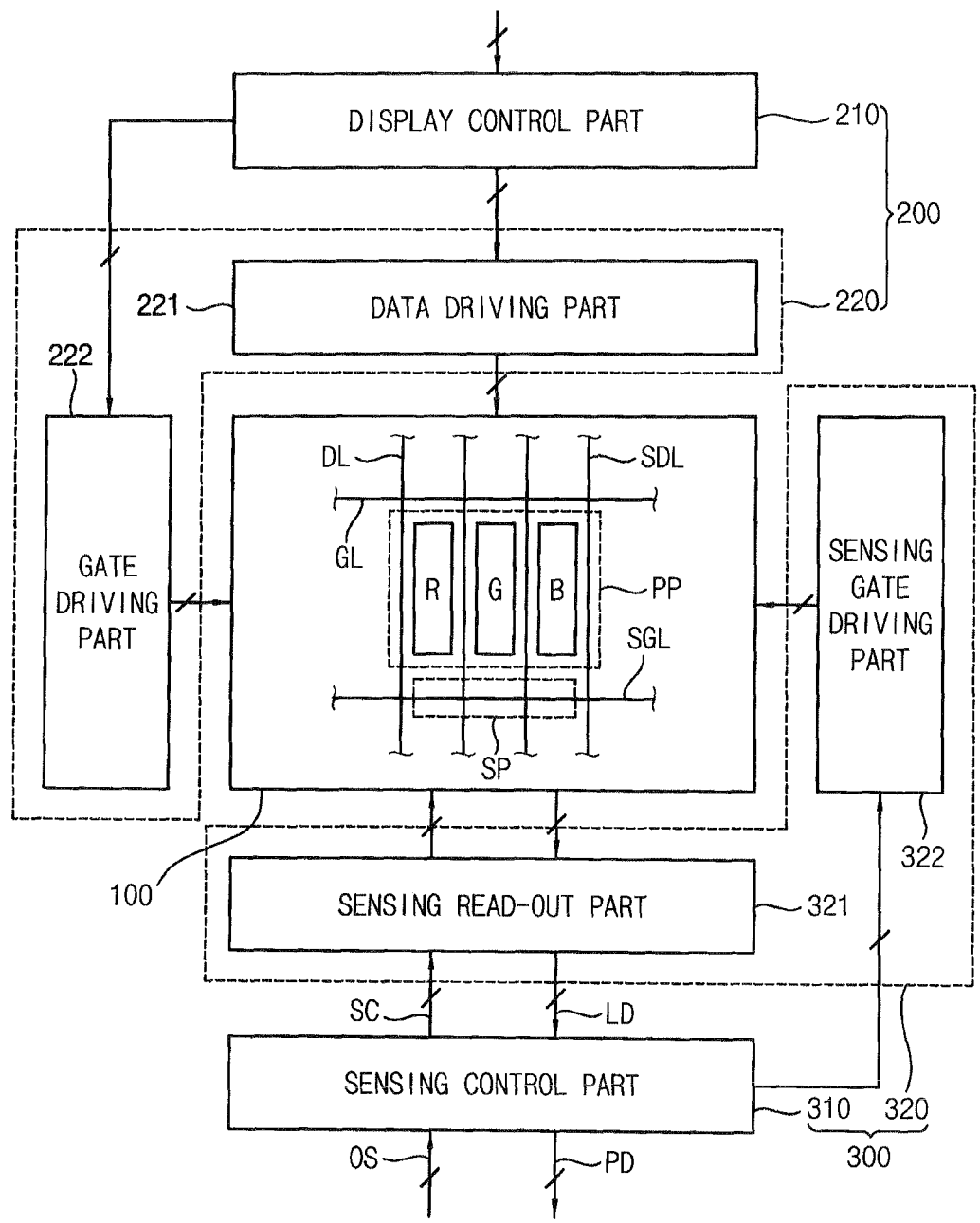
FIG. 1 is a block diagram of a display apparatus according to an exemplary embodiment.

FIG. 1 is a block diagram of a display apparatus according to an exemplary embodiment.

Referring to FIG. 1, the display apparatus includes a display/sensor panel part 100 and a display driving part 200 and a touch sensing part 300.

The display/sensor panel part 100 includes an active area that displays images (e.g. color images) and senses touches. The active area includes an array (plurality) of pixel parts PP displaying an image and a corresponding array (plurality) of sensing parts SP for sensing the touch of an object when it touches the surface of the display/sensor panel part 100. Each of the pixel parts PP includes a plurality of color sub pixels, for example, red, green and blue sub pixels R, G and B. Each of the color sub pixels R, G and B includes a liquid crystal (LC) capacitor and a liquid crystal for displaying a color component of the image being displayed.

For example, each LC capacitor of the color sub pixels R, G and B is electrically connected to one data line DL and to one gate line GL. The LC capacitor charges to a data voltage applied to the data line DL in response to a gate signal applied to the gate line GL.

The sensing part SP includes a touch sensor generating sensing data having multiple bits corresponding to variable scales (e.g., touch-pressure gradient scales, i.e., touchscales) arrayed to comprise a touch-image. The touch sensing type of the touch sensor may include a capacitive overlay type, a resistive overlay type, an infrared beam type, an integral strain gauge type, a surface acoustic wave type, a piezo electric type and so on.

The touch sensor of the sensing part SP is electrically connected to a sensing data line SDL and to a sensing gate line SGL. The sensing part SP outputs a sensing signal sensed from the touch sensor through a sensing data line SDL in response to a sensing gate signal applied to the sensing gate line SGL. As shown in FIG. 1, each sensing part SP may be disposed to corresponding to each pixel part PP. Alternatively, each sensing part SP may correspond to one or to each of the color sub pixels (R, G or B). The sensing part SP may be alternatively designed to be disposed at various positions relative to the color sub pixels (R, G or B).

The display/sensor panel part 100 includes a display panel (not shown) having the pixel part PP and a sensing panel (not shown) having the sensing part SP. The display panel and the sensing panel may be separated from each other. Alternatively, the sensing part SP may be built into the display panel having the pixel part PP so that the display panel and sensing panel are integrated. For example, the sensing part SP may be disposed on an array substrate at which the data line DL and the gate line GL are disposed, or may be disposed at a color filter substrate opposite to the array substrate.

The display driving part 200 includes a display control part 210 and a pixel driving part 220. The display control part 210 outputs display control signal and a data signal to drive the pixel part PP. The display control signal may included a data signal and a gate control signal. The data signal may include color data corresponding to the color sub pixels. The pixel driving part 220 includes a data driving part 221 providing the data line DL with a data signal and a gate driving part 222 providing the gate line GL with a gate signal.

The touch sensing part 300 includes a sensing control part 310 and a sensing driving part 320. The sensing control part 310 provides the sensing driving part 320 with sensing control signals to drive the sensing parts SP and receives sensing data from the sensing driving part 320.

The sensing driving part 320 includes a sensing read-out part 321 and a sensing gate driving part 322. The sensing read-out part 321 provides the sensing data lines DL with a bias signal to drive the touch sensors. The sensing read-out part 321 receives a sensing signal from the touch sensor through the sensing data line SDL and outputs the sensing data as a multibit digital number. The sensing gate driving part 322 drives in synchronization with the gate driving part 222.

According to an exemplary method aspect of the inventive concept, the sensing control part 310 maps low-resolution touch-image data received from the sensing driving part 320 to high-resolution data and detects a touch position of the object using the high-resolution touch-image data. A corresponding method of generating the high-resolution touch-image data will be explained below.

Figure 2:
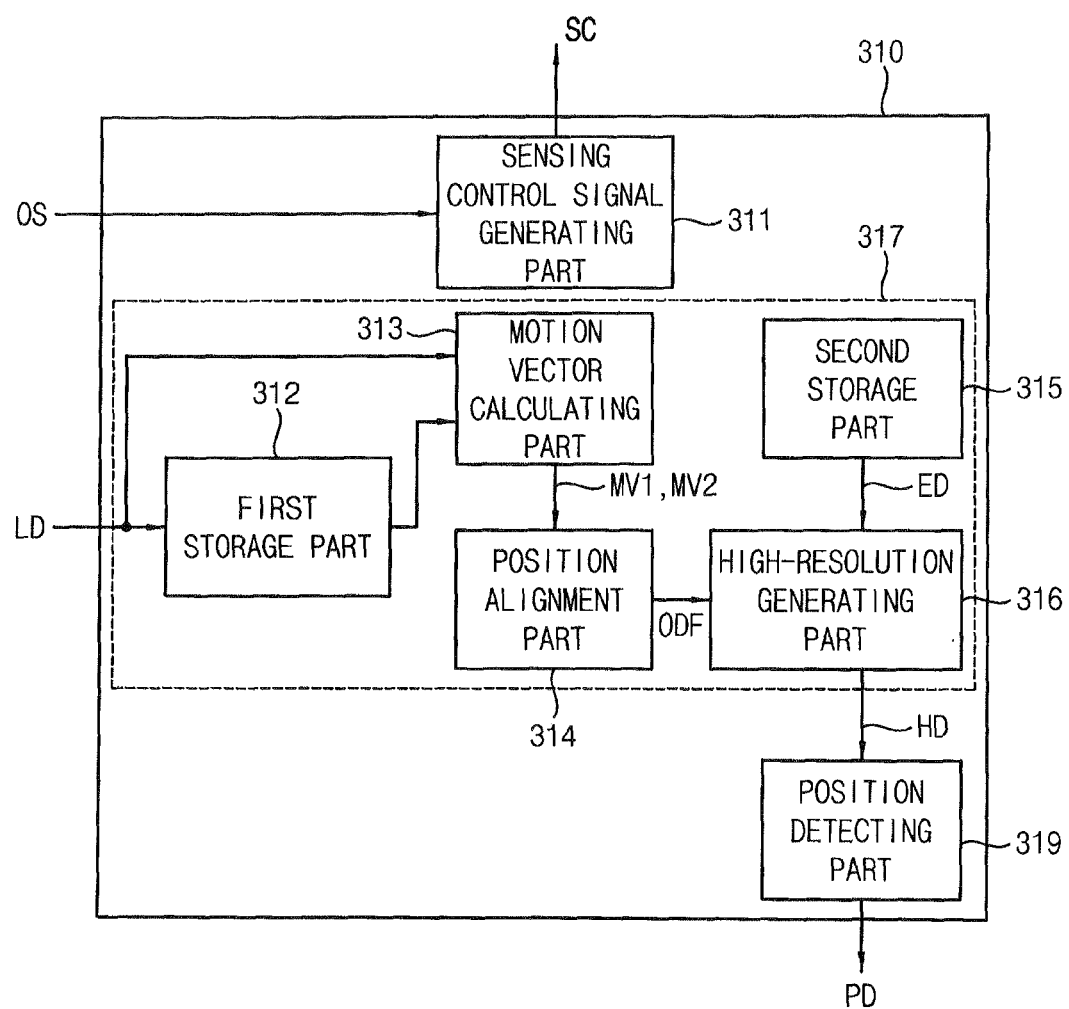
FIG. 2 is a block diagram of the sensing control part of the display apparatus of FIG. 1.
Figure 3:
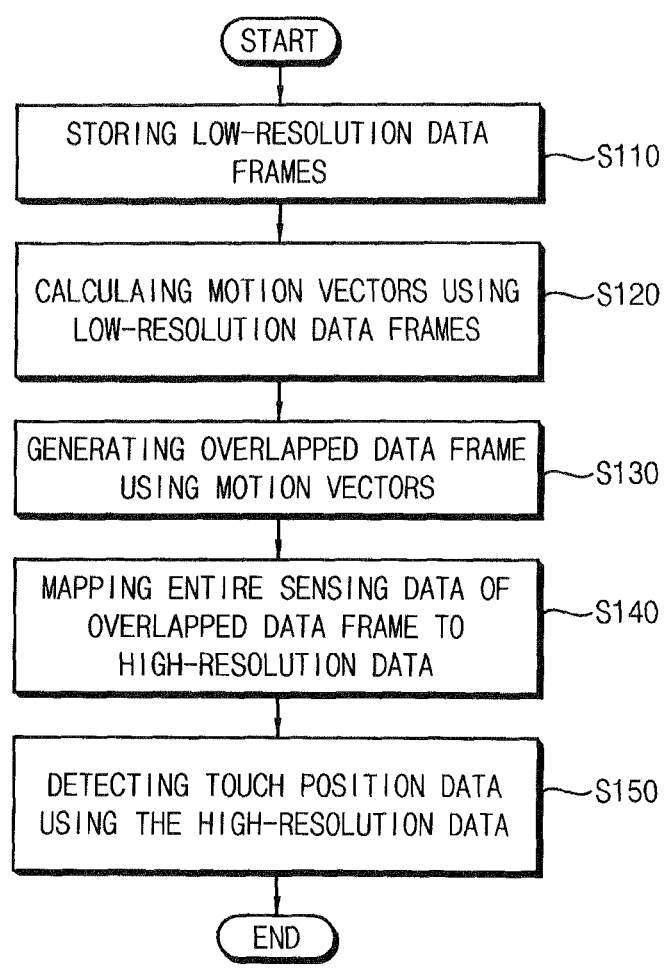
FIG. 3 is a flow diagram of a method of processing sensing data according to an exemplary embodiment.

FIG. 2 is a block diagram of the sensing control part of the display apparatus of FIG. 1. FIG. 3 is a flow diagram illustrating a method of processing sensing data according to an exemplary embodiment, and the method may performed by the exemplary embodiment of FIGS. 1 and 2.

Referring to FIGS. 1, 2 and 3, the sensing control part 310 includes a sensing control signal generating part 311, a sensing data processing part 317 and a position detecting part 319.

The sensing control signal generating part 311 receives an outside control signal OS (from outside of the sensing control part 310) and generates a sensing control signal SC using the outside control signal OS to drive the sensing driving part 320.

The sensing data processing part 317 maps low-resolution data LD received from the sensing read-out part 321 to high-resolution data HD.

The position detecting part 319 detects touch position data PD corresponding to the position of the touching object using the high-resolution data HD.

For example, the sensing data processing part 317 may include a first storage part 312, a motion vector calculating part 313, a position alignment part 314, a second storage part 315 and a high-resolution generating part 316.

The first storage part 312 stores the low-resolution data received from the sensing read-out part 321 (step S110). The sensing data are variable touchscale data. Hereinafter, data of a frame unit may be referred to as data frame. The first storage part 312 stores a plurality of low-resolution data frames. For example, the first storage part 312 stores (K-2)-th, (K-1)-th and (K)-th low-resolution data frames (wherein, K is a natural number for indexing time). A low-resolution data frame is a touch-image data frame that includes the low-resolution data received from sensing read-out part 321.

The motion vector calculating part 313 calculates a first motion vector MV1 and a second motion vector MV2 corresponding to the motion of the object using the (K-2)-th, (K-1)-th and (K)-th low-resolution data frames stored in the first storage part 312 (step S120). For example, the first motion vector MV1 is calculated between the (K-2)-th and (K-1)-th low-resolution data frames. The second motion vector MV2 is calculated between the (K-1)-th and (K)-th low-resolution data frames.

The position alignment part 314 aligns the sensing data of object touch-images included in the (K)-th, (K-1)-th and (K-2)-th low-resolution data frames using the first and second motion vectors MV1 and MV2 so that an overlapped data frame ODF overlapped the (K)-th, (K-1)-th and (K-2)-th low-resolution data frames is generated (step S130).

The second storage part 315 stores example based data ED to generate the high-resolution data. The example based data ED are preset data obtained by pre-experimenting with various motions of an object with respect to the display/sensor panel part.

The high-resolution generating part 316 generates the high-resolution data frame using the overlapped data frame ODF (step S140). In addition, the high-resolution generating part 316 corrects the high-resolution data frame using the example based data ED stored in the second storage part 315 so that an outline and a shape of an object touch-image may be naturally corrected. For example, the spacing distance between the sensing data in the high-resolution data frame may be decreased as ½ of the spacing distance between the sensing data in the low-resolution data frame.

As described above, the high-resolution data HD is provided to the position detecting part 319. The position detecting part 319 detects the touch position of the object and generates the touch position data PD of the object using the high-resolution data (step S150).

Figure 4A:
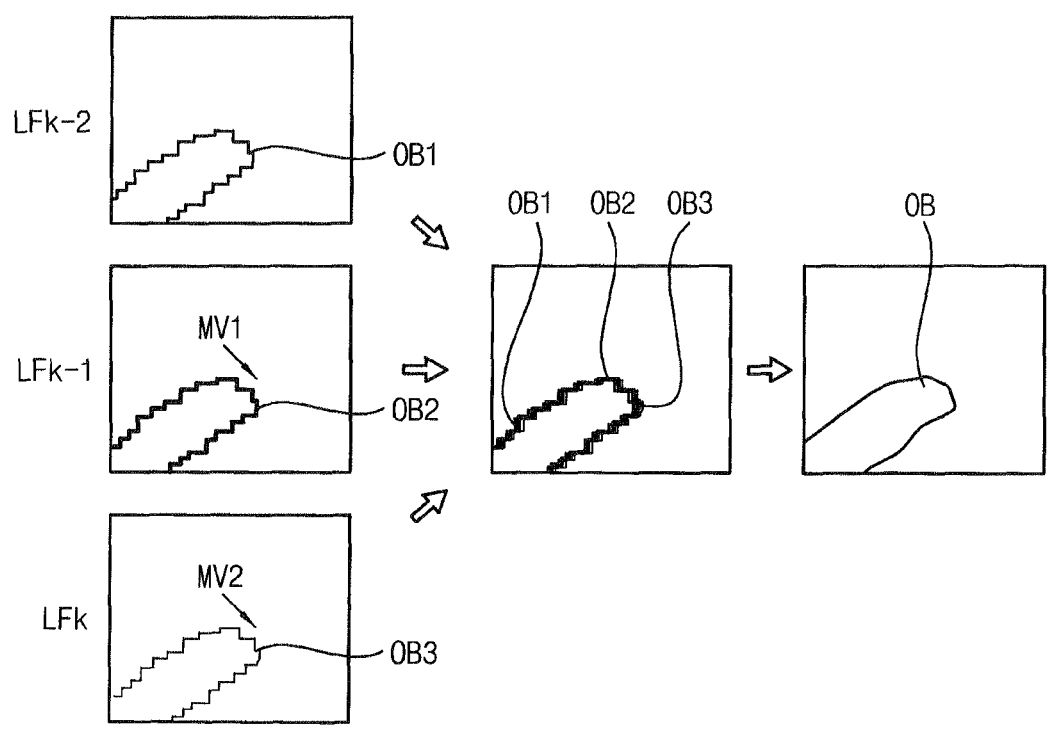
FIGS. 4A and 4B are conceptual diagrams illustrating the method of processing sensing data of FIG. 3.
Figure 4B:
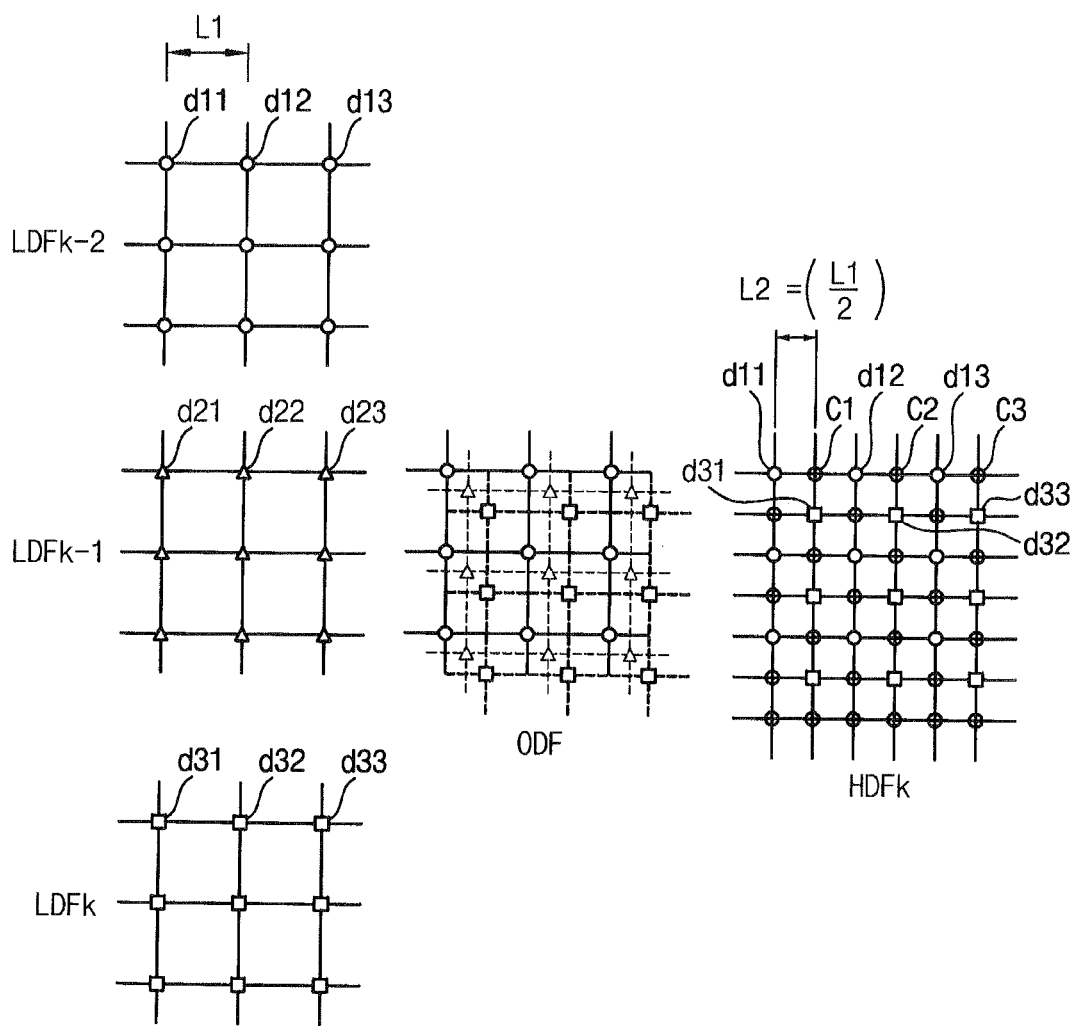

FIGS. 4A and 4B are conceptual diagrams illustrating the method of processing sensing data as shown in FIG. 3.

Referring to FIGS. 2, 4A and 4B, a user touches the surface of the display/sensor panel part using an object such as a stylus pen, a finger and so on. According to the touch of the user, sequential low-resolution data frames include the sensing data corresponding to the motion of the object.

For example, an (K-2)-th sensing frame image LFK-2 includes an object touch-image of a first position OB1. The (K-2)-th sensing frame image LFK-2 is displayed on the display/touch panel part using an (K-2)-th low-resolution data frame LDFK-2. The (K-2)-th low-resolution data frame LDFK-2 includes first sensing data d11, d12, d13, . . . arranged as a matrix type. The spacing distance between the first sensing data d11, d12, d13, . . . is a first spacing distance L1.

The (K-1)-th sensing frame Image LFK-1 followed by the (K-2)-th sensing frame Image LFK-2 includes the object touch-image of a second position OB1. The (K-1)-th sensing frame image LFK-1 is displayed on the display/touch panel part using an (K-1)-th low-resolution data frame LDFK-1. The (K-1)-th low-resolution data frame LDFK-1 includes second sensing data d21, d22, d23, . . . arranged as a matrix. The spacing distance between the second sensing data d21, d22, d23, . . . is the first spacing distance L1.

An (K)-th sensing frame image LFK followed by the (K-1)-th sensing frame image LFK-1 includes the object touch-image of a third position OB3. The (K)-th sensing frame image LFK is displayed on the display/touch panel part using an (K)-th low-resolution data frame LDFK. The (K)-th low-resolution data frame LDFK includes third sensing data d31, d32, d33, . . . arranged as the matrix type. The spacing distance between the third sensing data d31, d32, d33, . . . ) is the first spacing distance L1.

Sequential (K-2)-th, (K-1)-th and (K)-th low-resolution data frames LDFK-2, LDFK-1, and LDFK are compared with each other so that the motion of the detected object is estimated and a plurality of motion vectors are calculated by the estimated motion. For example, the first and second sensing data of the (K-2)-th and (K-1)-th low-resolution data frames LDFK-2 and LDFK-1 are compared with each other so that the motion of the object moving from the first position OB1 to the second position OB2 may be estimated. Thus, a first motion vector MV1 corresponding to the object is calculated by the estimated motion.

The (K-1)-th and (K)-th low-resolution data frames LDFK-1 and LDFK are compared with each other so that the motion of the object moving from the second position OB2 to the third position OB3 may be estimated. Thus, a second motion vector MV2 corresponding to the object is calculated by the estimated motion.

The (K-2)-th, (K-1)-th and (K)-th sensing frame images LFK-2, LFK-1 and LFK overlap with each other to align the object touch-images of the first, second and third positions OB1, OB2 and OB3 using the first and second motion vectors MV1 and MV2. In other words, as shown in FIG. 4B, the sensing data of the object touch-images included in the (K-2)-th, (K-1)-th and (K)-th low-resolution data frames LDFK-2, LDFK-1 and LDFK are overlapped each other based on the first and second motion vectors MV1 and MV2 so that the overlapped data frame ODF are generated.

The high-resolution data frame HDFK is generated using the sensing data of the overlapped data frame ODF. The spacing distance between the sensing data of the high-resolution data frame is a second spacing distance L2 less than (half of) the first spacing distance L1. The second spacing distance L2 may is preferably ½ (half) of the first spacing distance L1.

For example, the overlapped data frame ODF includes the first, second and third sensing data d11, d12, d13, ..., d21, d22, d23, ..., d31, d32, d33, .... The data of the high-resolution data frame HDFK is mathematically calculated (interpolated) using the first, second and third sensing data d11, d12, d13, ..., d21, d22, d23, ..., d31, d32, d33, ....

As shown in FIG. 4, the first and third sensing data d11, d12, d13, ..., d31, d32, d33, ... in the overlapped data frame ODF which are disposed at data coordinates of the high-resolution data frame HDFK are determined as among the sensing data of the high-resolution data frame HDFK.

In addition, remaining data c1, c2, c3, ... of the high-resolution data frame HDFK are mathematically calculated (interpolated) using the first and third sensing data d11, d12, d13, ..., d31, d32, d33, ... determined as the sensing data of the high-resolution data frame HDFK and the second sensing data d21, d22, d23, ... of the overlapped data frame ODF. For example, the remaining data c1, c2, c3, ... may be mathematically calculated by a linear interpolation algorithm. As described above, the high-resolution data frame HDFK is generated using entire sensing data of the overlapped data frame ODF.

Then, the sensing data of the high-resolution data frame HDFK corresponding to the object touch-image are corrected using the example based data so that an outline and a shape of the object touch-image may be naturally corrected (i.e., calibrated).

As the present exemplary embodiment, the high-resolution data frame HDFK is generated using sequential low-resolution data frames LDFK-2, LDFK-1 and LDFK so that an accurate sensing data of the object may be obtained. Therefore, the touch position of the object may be accurately detected.

Figure 5:
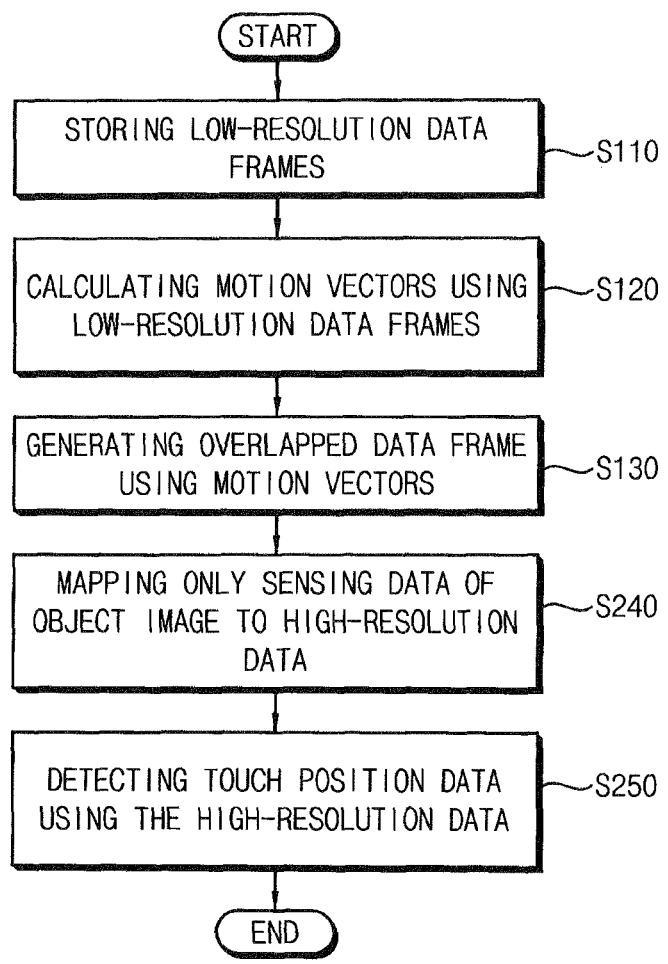
FIG. 5 is a flow diagram illustrating a method of processing sensing data according to an exemplary embodiment.

FIG. 5 is a flow diagram illustrating a method of processing sensing data according to another exemplary embodiment. Hereinafter, the same reference numerals are used to refer to the same or like parts as those described in the previous exemplary embodiments, and the same detailed explanations are simplified.

According to the present exemplary embodiment, a method of processing the sensing data is substantially the same as the method of the previously exemplary embodiment except for the step of generating the high-resolution data.

Referring to FIGS. 2, 4B and 5, the first storage part 312 stores the low-resolution data received from the sensing readout part 321 (step S110).

First and second motion vectors MV1 and MV2 are calculated using sequential (K-2)-th, (K-1)-th and (K)-th low-resolution data frames LDFK-2, LDFK-1 and LDFK (step S120).

The (K-2)-th, (K-1)-th and (K)-th sensing frame images LFK-2, LFK-1 and LFK overlap with each other to align the object touch-images of the first, second and third positions OB1, OB2 and OB3 the object touch-images using the first and second motion vectors MV1 and MV2. In other words, as shown in FIG. 4B, the sensing data of the object included in the (K-2)-th, (K-1)-th and (K)-th low-resolution data frames LDFK-2, LDFK-1 and LDFK are overlapped each other based on the first and second motion vectors MV1 and MV2 so that the overlapped data frame ODF are generated (step S130).

As shown in FIG. 4B, only sensing data of a first area (corresponding to an object) in the overlapped data frame ODF is mapped to the high-resolution data (step S240). The first area includes the sensing data of the object touch-image.

However, the sensing data of a second area in the overlapped data frame ODF area are not mapped to the high-resolution data. The second area is a remaining area except for the first area in the overlapped data frame ODF. The sensing data of the second area may be the low-resolution data or be omitted.

For example, the sensing data of the second area may be applied as the low-resolution data in one of the (K-2)-th, (K-1)-th and (K)-th low-resolution touch-image data frames. For example, the sensing data of the second area may be applied as the sensing data of the last low-resolution touch-image data frame of the sequential low-resolution data frames. In addition, the sensing data of the second area are not generated and may be omitted.

Only sensing data of the detected object's touch-image are mapped to the high-resolution data, and the high-resolution data are corrected based on the example based data stored in the second storage part 315 so that the outline and the shape of the object touch-image are naturally corrected.

According to the present exemplary embodiment, (in comparison with the previously exemplary embodiment including mapping the entire sensing data of the overlapped data frame ODF to the high-resolution data), only sensing data corresponding to the detected object's touch-image maps to the high-resolution data so that a high-speed driving may be easy.

The position detecting part 319 detects the touch position data PD of the object using the high-resolution touch-image data (step S250).

According to the present exemplary embodiment, the high-resolution touch-image data frame HDFK is generated using sequential low-resolution data frames LDFK-2, LDFK-1 and LDFK so that accurate (i.e., higher precision, higher resolution) sensing data of the object may be obtained. Therefore, the touch position of the object may be accurately detected.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, any means-plus-function clauses are intended to cover the structures described herein as performing the recited function and not only structural equivalents but also equivalent-function structures. Therefore, it is to be understood that the foregoing is illustrative of the inventive concept and is not to be construed as limited to the specific exemplary embodiments disclosed, and that modifications to the disclosed exemplary embodiments, as well as variations from the exemplary embodiments, are intended to be included within the scope of the appended claims. The inventive concept is defined by the following claims, with equivalents of the claims to be included therein.

What is claimed is:

1. A method of processing touch sensor data comprising:
calculating a plurality of motion vectors using a plurality of low-resolution touch-image data frames;
aligning sensing data corresponding to an object represented in the low-resolution touch-image data frames using the motion vectors to generate an overlapped touch-image data frame;
generating high-resolution touch-image data corresponding to the object using the overlapped touch-image data frame; and detecting a touch position data of the object using the high-resolution touch-image data corresponding to the object.

2. The method of claim 1, further comprising:
correcting the high-resolution touch-image data corresponding to the object using example based data stored in a storage part.

3. The method of claim 1, wherein the sensing data have multiple bits corresponding to a touchscale.

4. The method of claim 1, wherein the spacing distance of the high-resolution data equals ½ of the spacing distance of the low-resolution data.

5. The method of claim 1, wherein the generating the high-resolution data comprises:
mapping entire sensing data of the overlapped touch-image data frame to high-resolution touch-image data.

6. The method of claim 1, wherein the generating the high-resolution data comprises:
mapping sensing data of a first area in the overlapped data touch-image frame to high-resolution touch-image data, the first area including the sensing data of the object.

7. The method of claim 6, wherein the generating the high-resolution touch-image data further comprises:
applying sensing data in one of the low-resolution touch-image data frames as sensing data of a second area of the overlapped touch-image data frame, the second area being except for the first area in the overlapped touch-image data frame.

8. The method of claim 6, wherein the generating the high-resolution touch-image data further comprises:
omitting sensing data of a second area except for the first area in the overlapped touch-image data frame.

9. A display apparatus comprising:
a display/sensor panel part comprising a plurality of pixel parts for displaying an image and a plurality of sensing parts for sensing the touch-image of an object;
a display driving part driving the pixel parts;
a sensing driving part driving the sensing parts; and
a sensing control part calculating a plurality of motion vectors using a plurality of low-resolution touch-image data frames, aligning sensing data corresponding to an object in the low-resolution touch-image data frames using the motion vectors to generate an overlapped touch-image data frame and generating high-resolution touch-image data corresponding to the object using the overlapped touch-image data frame.

10. The display apparatus of claim 9, wherein the sensing control part comprises:
a motion vector calculating part calculating a plurality of motion vectors using a plurality of low-resolution touch-image data frames;
a position alignment part aligning sensing data corresponding to an object in the low-resolution touch-image data frames using the motion vectors to generate an overlapped touch-image data frame;
a high-resolution generating part generating high-resolution touch-image data corresponding to the object using the overlapped touch-image data frame; and
a position detecting part detecting a touch position data of the object using the high-resolution touch-image data of the object.

11. The display apparatus of claim 10, wherein the high-resolution generating part corrects the high-resolution touch-image data of the object using example based data stored in a storage part.

12. The display apparatus of claim 10, wherein the sensing data have multiple bits corresponding to a touchscale.

13. The display apparatus of claim 10, wherein the spacing distance between the high-resolution touch-image data is decreased as ½ of the spacing distance between the low-resolution touch-image data.

14. The display apparatus of claim 10, wherein the high-resolution generating part maps entire sensing data of the overlapped touch-image data frame to high-resolution data.

15. The display apparatus of claim 10, wherein the high-resolution generating part maps sensing data of a first area in the overlapped touch-image data frame to high-resolution data, the first area including the sensing data of the object.

16. The display apparatus of claim 15, wherein the high-resolution generating part applies sensing data in one of the low-resolution touch-image data frames as sensing data of a second area of the overlapped touch-image data frame, the second area being except for the first area in the overlapped touch-image data frame.

17. The display apparatus of claim 15, wherein the high-resolution generating part omits sensing data of a second area except for the first area in the overlapped touch-image data frame.

18. A touch sensing apparatus comprising:
a touch-sensor panel part comprising a plurality of sensing parts for sensing the touch-image of an object;
a sensing driving part driving the sensing parts; and
a sensing control part calculating a plurality of motion vectors using a plurality of low-resolution touch-image data frames, aligning sensing data corresponding to an object in the low-resolution touch-image data frames using the motion vectors to generate an overlapped touch-image data frame and generating high-resolution touch-image data corresponding to the object using the overlapped touch-image data frame.

19. The apparatus of claim 18, wherein the sensing control part comprises:
a motion vector calculating part calculating a plurality of motion vectors using a plurality of low-resolution touch-image data frames;
a position alignment part aligning sensing data corresponding to an object in the low-resolution touch-image data frames using the motion vectors to generate an overlapped touch-image data frame;
a high-resolution generating part generating high-resolution touch-image data corresponding to the object using the overlapped touch-image data frame; and
a position detecting part detecting a touch position data of the object using the high-resolution touch-image data of the object.

20. The apparatus of claim 19, wherein the high-resolution generating part corrects the high-resolution touch-image data of the object using example based data stored in a storage part.

* * * * *